(12) United States Patent
Naney (10) Patent No.: US 12,050,361 B2
(45) Date of Patent: Jul. 30, 2024

(54) ADJUSTABLE LENS GROUP WITH CONCENTRIC LENS ELEMENTS THREADED INTO AUTO-FOCUS ACTUATOR FOR HIGH SHOCK RESISTANCE AND ACTIVE ALIGNED TO FIXED LENS GROUP

(71) Applicant: ZEBRA TECHNOLOGIES CORPORATION, Lincolnshire, IL (US)

(72) Inventor: Alexander J. Naney, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 91 days.

(21) Appl. No.: 17/589,743

(22) Filed: Jan. 31, 2022

(65) Prior Publication Data

US 2023/0244056 A1 Aug. 3, 2023

(51) Int. Cl.
*G06K 7/10* (2006.01)
*G02B 7/04* (2021.01)
*G06K 7/14* (2006.01)

(52) U.S. Cl.
CPC ............ *G02B 7/04* (2013.01); *G06K 7/10811* (2013.01); *G06K 7/1408* (2013.01); *G06K 7/1439* (2013.01); *G06K 2007/10485* (2013.01)

(58) Field of Classification Search
CPC ........... G06K 7/10801; G06K 7/10811; G06K 7/10821; G06K 7/10831; G06K 7/1408; G06K 7/1439; G06K 2007/10485; G02B 7/04; G02B 7/021–023; G02B 7/08
See application file for complete search history.

(56) References Cited

U.S. PATENT DOCUMENTS

| 2009/0009893 A1 | 1/2009 | Wang |
| 2010/0110270 A1 | 5/2010 | Sekimoto et al. |
| 2010/0265599 A1* | 10/2010 | Lin .................... G02B 7/04 |
| | | 359/823 |

(Continued)

OTHER PUBLICATIONS

International Search Report and Written Opinion for International Application No. PCT/US2023/11046 mailed on Jun. 14, 2023.

*Primary Examiner* — Thien M Le
*Assistant Examiner* — April A Taylor
(74) *Attorney, Agent, or Firm* — Yuri Astvatsaturov (57) ABSTRACT

A barcode reader, an imaging engine, and an optical assembly and method for assembling such to maintain stability through physical shock and to control decentration are disclosed herein. An example optical assembly includes an actuator, adjustable lens group, and rear lens group. The actuator includes an inner carriage, wherein one or more inner walls of the inner carriage are at least partially threaded. The adjustable lens group includes a first lens element, wherein the first lens element is threaded and held in place by the at least partially threaded one or more inner walls of the inner carriage, and a second lens element, wherein the second lens element is coupled to the first lens element, and further wherein the second lens element is fixedly co-located to the first lens element. The front lens group is actively aligned to the rear lens group, which includes one or more fixed optical elements.

36 Claims, 5 Drawing Sheets

(56) References Cited

U.S. PATENT DOCUMENTS

| | | | |
|---|---|---|---|
| 2011/0134550 A1* | 6/2011 | Wu | G02B 7/04 |
| | | | 359/825 |
| 2019/0179132 A1* | 6/2019 | Kang | G02B 26/0875 |
| 2019/0377165 A1 | 12/2019 | Chia et al. | |
| 2021/0263290 A1 | 8/2021 | Vinogradov et al. | |
| 2021/0373274 A1* | 12/2021 | Naney | G02B 7/09 |
| 2022/0066126 A1 | 3/2022 | Vinogradov et al. | |

\* cited by examiner

ADJUSTABLE LENS GROUP WITH CONCENTRIC LENS ELEMENTS THREADED INTO AUTO-FOCUS ACTUATOR FOR HIGH SHOCK RESISTANCE AND ACTIVE ALIGNED TO FIXED LENS GROUP

BACKGROUND

Imaging devices generally capture images within a given field of view (FOV). It is often required that the scanning devices capture images at various distances and at various fields of view to effectively decode information in an image for use in a barcode reader. Additionally, the demand for portable sensors is increasing, which requires the use of smaller sensors and smaller imaging lenses. However, portable sensors are at risk of being dropped or otherwise subjected to physical shocks, jarring elements of the sensors loose and leading to breakdowns in equipment and technology.

Accordingly, there is a need for improved systems, methods, and devices which address these issues.

SUMMARY

In an embodiment, the present invention is an optical assembly for use in an imaging engine to maintain stability through physical shock and to control decentration. The optical assembly includes: an actuator including an inner carriage, wherein one or more inner walls of the inner carriage are at least partially threaded; an adjustable lens group disposed along a central optical axis to receive light, the adjustable lens group including: a first lens element disposed along the central optical axis, wherein the first lens element is threaded and held in place by the at least partially threaded one or more inner walls of the inner carriage, and a second lens element, wherein the second lens element is coupled to the first lens element, and further wherein the second lens element is fixedly co-located to the first lens element such that the second lens element is disposed along the central optical axis, a geometrical axis of the second lens element is substantially aligned with the central optical axis, and the partially threaded one or more inner walls of the inner carriage holds the second lens element by the fixed co-location to the first lens element; and a rear lens group disposed in a rear housing and along the central optical axis to receive light from the adjustable lens group, wherein: the front lens group is actively aligned relative to the rear lens group, the rear lens group includes fixed optical elements, and the actuator and the rear housing are fixed to a chassis.

In a variation of this embodiment, the physical shock has an acceleration of up to at least 4500 g.

In another variation of this embodiment the actuator is a voice coil motor actuator.

In yet another variation of this embodiment, the inner carriage of the actuator is free-floating relative to a remainder of the actuator.

In another variation of this embodiment, threads of the first lens element are attached to threads of the at least partially threaded inner walls by way of an adhesive.

In yet another variation of this embodiment the actuator is configured to change a focus of the optical assembly by adjusting a position of the adjustable lens group relative to the rear lens group.

In still yet another variation of this embodiment, the actuator is disposed such that neither of the actuator nor the adjustable lens group physically touch the fixed optical elements.

In another variation of this embodiment, the first lens element is a plastic lens.

In yet another variation of this embodiment the second lens element is a plastic lens.

In still yet another variation of this embodiment, the adjustable lens group further comprises: a third lens element, wherein the third lens element is coupled to the second lens element, and further wherein the third lens element is fixedly co-located to the second lens element such that the third lens element is disposed along the central optical axis and a geometrical axis of the third lens element is substantially aligned with the central optical axis.

In another embodiment, the present invention is an imaging engine that maintains stability of lenses through physical shock. The imaging engine includes: an optical assembly, the optical assembly including: an actuator including an inner carriage, wherein one or more inner walls of the inner carriage are at least partially threaded; an adjustable lens group disposed along a central optical axis to receive light, the adjustable lens group including: a first lens element disposed along the central optical axis, wherein the first lens element is threaded and held in place by the at least partially threaded one or more inner walls of the inner carriage, and a second lens element, wherein the second lens element is coupled to the first lens element and further wherein the second lens element is fixedly co-located to the first lens element such that the second lens element is disposed along the central optical axis, a geometrical axis of the second lens element is substantially aligned with the central optical axis, and the at least partially threaded one or more inner walls of the inner carriage holds the second element by the fixed co-location to the first lens element; a rear lens group disposed in a rear housing and along the central optical axis to receive light from the adjustable lens group, wherein: the front lens group is actively aligned relative to the rear lens group, the rear lens group includes fixed optical elements, and the actuator and the rear housing are fixed to a chassis; an imaging sensor disposed along the central optical axis such that the imaging sensor receives light from the optical assembly; and a microprocessor and computer-readable media storing machine readable instructions that, when executed, cause the actuator to change a focus of the optical assembly by adjusting a position of the adjustable lens group.

In a variation of this embodiment, the physical shock has an acceleration of up to at least 4500 g.

In another variation of this embodiment the actuator is a voice coil motor actuator.

In yet another variation of this embodiment, the inner carriage of the actuator is free-floating relative to a remainder of the actuator.

In another variation of this embodiment, threads of the first lens element are attached to threads of the at least partially threaded inner walls by way of an adhesive.

In yet another variation of this embodiment the actuator changes the focus of the optical assembly by adjusting a position of the adjustable lens group relative to the rear lens group.

In still yet another variation of this embodiment, the actuator is disposed such that neither of the actuator nor the adjustable lens group physically touch the one or more fixed optical elements.

In another variation of this embodiment, the first lens element is a plastic lens.

In yet another variation of this embodiment the second lens element is a plastic lens.

In still yet another variation of this embodiment, the adjustable lens group further comprises: a third lens element, wherein the third lens element is coupled to the second lens element, and further wherein the third lens element is fixedly co-located to the second lens element such that the third lens element is disposed along the central optical axis and a geometrical axis of the third lens element is substantially aligned with the central optical axis.

In yet another embodiment, the present invention is a barcode scanning platform having a field of view (FOV) and for scanning a barcode in the FOV. The barcode scanning platform includes: an optical assembly, the optical assembly including: an actuator including an inner carriage, wherein one or more inner walls of the inner carriage are at least partially threaded; an adjustable lens group disposed along a central optical axis to receive light from the barcode in the FOV, the adjustable lens group including: a first lens element disposed along the central optical axis, wherein the first lens element is threaded and held in place by the at least partially threaded one or more inner walls of the inner carriage, and a second lens element, wherein the second lens element is coupled to the first lens element and further wherein the second lens element is fixedly co-located to the first lens element such that the second lens element is disposed along the central optical axis, a geometrical axis of the second lens element is substantially aligned with the central optical axis, and the at least partially threaded one or more inner walls of the inner carriage holds the second lens element by the fixed co-location to the first lens element; a rear lens group disposed in a rear housing and along the central optical axis to receive light from the adjustable lens group, wherein: the front lens group is actively aligned relative to the rear lens group, the rear lens group includes fixed optical elements, and the actuator and the rear housing are fixed to a chassis; an imaging sensor disposed along the central optical axis such that the imaging sensor receives light from the optical assembly; and a microprocessor and computer-readable media storing machine readable instructions that, when executed, cause the actuator to focus the adjustable lens group.

In another variation of this embodiment, the physical shock has an acceleration of up to at least 4500 g.

In yet another variation of this embodiment the actuator is a voice coil motor actuator.

In still yet another variation of this embodiment, the inner carriage of the actuator is free-floating relative to a remainder of the actuator.

In another variation of this embodiment, threads of the first lens element are attached to threads of the at least partially threaded inner walls by way of an adhesive.

In yet another variation of this embodiment the actuator changes a focus of the optical assembly by adjusting a position of the adjustable lens group relative to the rear lens group.

In still yet another variation of this embodiment, the actuator is disposed such that neither of the actuator nor the adjustable lens group physically touch the one or more fixed optical elements.

In another variation of this embodiment, the first lens element is a plastic lens.

In yet another variation of this embodiment the second lens element is a plastic lens.

In still yet another variation of this embodiment, the adjustable lens group further comprises: a third lens element, wherein the third lens element is coupled to the second lens element, and further wherein the third lens element is fixedly co-located to the second lens element such that the third lens element is disposed along the central optical axis and a geometrical axis of the third lens element is substantially aligned with the central optical axis.

In still yet another embodiment, the present invention is a method of assembling an optical assembly for use in an imaging engine having a field of view (FOV), wherein the optical assembly maintains stability through physical shock and controls decentration. The method of assembling the optical assembly includes: screwing a first lens element into an at least partially threaded actuator carriage, wherein the first lens element is threaded and wherein the first lens element is disposed along a central optical axis; applying an adhesive to threads of the first lens element and threads of the at least partially threaded actuator carriage; coupling a second lens element to the first lens element, wherein the second lens element is fixedly co-located to the first lens element such that the second lens element is disposed along the central optical axis and a geometrical axis of the second lens element is substantially aligned with the central optical axis; and fixing the optical assembly and an assembled rear lens group comprising fixed lens elements to a chassis such that the threaded actuator carriage can move the first lens element and the second lens element relative to the assembled rear lens group.

In a variation of this embodiment, the method further comprises actuating the carriage of the actuator to a bottom position before screwing the first lens element.

In another variation of this embodiment, the method further comprises inserting a simulator lens to the carriage of the actuator before screwing the first lens element, wherein the first lens element is screwed in relative to the simulator lens.

In yet another variation of this embodiment the method further comprises, responsive to screwing the first lens element and before coupling the second lens element to the first lens element, removing the simulator lens.

In still yet another variation of this embodiment, the first lens element is screwed along a first direction into the actuator carriage until the actuator carriage blocks the first lens element from further movement along the first direction.

In another variation of this embodiment, the method further comprises aligning the optical assembly to the assembled rear lens group by a five axis gripper that moves the optical assembly by tilting the optical assembly along an x-axis, a y-axis, and a z-axis.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In creating compact long-range imaging engines for barcode readers and/or compact barcode readers, stability and durability is generally desirable. As such, it is further desirable for optical components of compact imaging engines and/or compact barcode readers to maintain stability and functionality through physical/mechanical shocks. For example, a barcode reader or an imaging engine in a barcode reader should ideally be able to withstand drops from various heights. The current disclosure describes a long-range imaging engine that employs an actuator to move an adjustable lens group that improves upon current technologies by: (i) improving stability and durability of lens assemblies in a barcode reader and/or imaging engine; (ii) reducing the size and cost of barcode readers and/or imaging engines for barcode readers; and (iii) maintaining optical characteristics of the lens assembly, such as centration.

In an exemplary implementation, the present application provides an imaging engine for decoding barcodes. The imaging engine comprises an imaging sensor (i.e., imager) and a lens assembly for long range imaging of a barcode via the imaging engine. In further exemplary implementations, the present application provides a barcode reader including the aforementioned imaging engine or a barcode reader designed to provide similar functionality as the imaging engine. In various embodiments, the lens assembly includes an adjustable lens group and a rear lens group, both disposed along a central optical axis. The adjustable lens group is disposed along a central optical axis and includes a threaded lens element and a second lens element fixedly co-located to the threaded lens element. Both lens elements are disposed along the central optical axis to receive light from an object of interest. In an exemplary implementation, the adjustable lens group is contained in an actuator that actively aligns the adjustable lens group to the rear lens group. The rear lens group includes fixed optical elements, each of which is disposed to receive light.

The lens assembly of the current disclosure provides a number of improvements over a traditional barcode reader/engine lens assembly. A traditional barcode reader/engine lens assembly utilizes lens holders to maintain stability and durability for optical elements in the lens assembly. However, lens holders add unneeded bulk to the lens assembly while reducing the effective size of the aperture, leading to scalability and performance problems. As such, it will be appreciated that the lens assembly and the barcode reader/engine of the present disclosure allows for greater reduction in size while maintaining sufficient stability and durability compared to traditional techniques.

Figure 1:
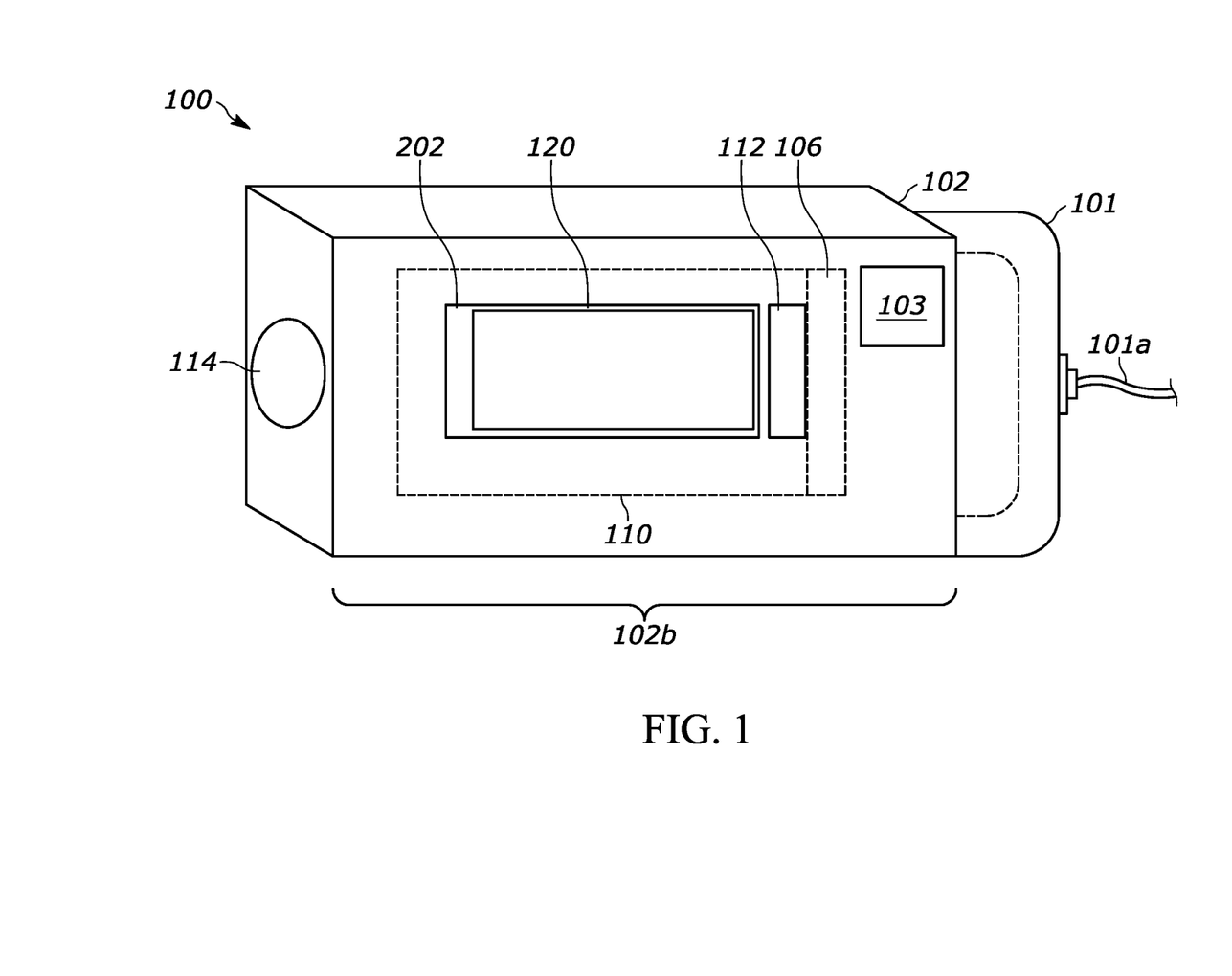
FIG. 1 illustrates a schematic side view of an imaging engine having a lens assembly in accordance with some embodiments.

Referring first to FIG. 1, a first implementation of an imaging engine device is shown schematically. The imaging engine device 100 includes a housing 102 and an imaging system 110 that is at least partially disposed within the housing 102 that includes an imaging camera assembly. In particular, the imaging system 110 includes an imaging sensor 112 and a lens assembly 120. Depending on the implementation, the lens assembly 120 may be partially or entirely encapsulated within an actuator 202. The device 100 may be adapted to be inserted into a docking station 101 which, in some examples, may include an AC power source 101a to provide power for the device 100. The device 100 may further include an onboard power supply 103, such as a battery and a printed circuit board (PCB) 106 that may accommodate a memory and a controller that controls operation of the imaging system 110. In embodiments, the device 100 may include a trigger (not shown in the illustration) that is used to activate the imaging system 110 to capture an image. The device 100 may include any number of additional components such as decoding systems, processors, and/or circuitry coupled to the circuit board 106 to assist in operation of the device 100.

The housing 102 includes a forward or reading head portion 102b, which supports the imaging system 110 within an interior region of the housing 102. The imaging system 110 may, but does not have to, be modular as it may be removed or inserted as a unit into the devices, allowing the ready substitution of imaging systems 110 having different imaging characteristics (e.g., camera assemblies having different focal distances, working ranges, and FOVs) for use in different devices and systems. In some examples, the field of view may be static.

The imaging sensor 112 may have multiple photosensitive elements forming a substantially flat surface. Further, the imaging sensor 112 may be fixedly mounted relative to the housing 102 using any number of components and/or approaches. The imaging sensor 112 further has a defined central imaging axis, A (see FIG. 2), that is normal to the substantially flat surface. In some implementations, the imaging sensor 112 may be a charge coupled device, or another solid-state imaging device. The imaging sensor 112 may be a one megapixel sensor with pixels of approximately three microns in size. In further implementations, the imaging sensor 112 includes 3 millimeter pixels, having a total of about 2 megapixels, resulting in an overall imaging sensor width and length of 3 microns in each dimension. In still further implementations, the lens assembly 120 is configured to capture images with a modulation transfer function of 40% at 160 line pairs per millimeter. The lens assembly 120 may also be disposed in the imaging system 110 so as to avoid physical contact between the any optical elements of the lens assembly 120 and the imaging sensor 112.

In some implementations, the central optical axis A is coaxial with a central axis of the lens assembly 120. As described in more detail with regard to FIG. 2 below, the lens assembly 120 is partially mounted to an actuator (see FIG. 2). At least some portions of the lens assembly 120 are threaded and screwed in to the actuator. In some implementations, an applied adhesive further holds the threading and the elements of the lens assembly 120 in place. Further portions of the lens assembly 120 are disposed such that the additional portions are fixedly co-located to the threaded element of the lens assembly 120. The actuator encapsulating the portion of the lens assembly 120 may be partially fixedly mounted relative to the housing 102 using any number of components and/or approaches. The remainder of the lens assembly 120 may also be partially fixedly mounted relative to the housing 102 using any number of components and/or approaches.

In the illustrated embodiment, the lens assembly 120 is positioned between a front aperture 114 and the imaging sensor 112. The front aperture 114 blocks light from objects outside of the field of view, which reduces imaging problems due to stray light from objects other than the target object. Additionally, the front aperture 114 in conjunction with one or more lenses allows for the image to form correctly on the imaging sensor 112. In some implementations, the front aperture 114 is circular and has a diameter of 2.0 millimeters. In further implementations, the front aperture 114 has a diameter in the range of 1.5 millimeters to 4.0 millimeters. In still further implementations, the front aperture 114 may be of any suitable shape and be of a similar size to a circle with a diameter in the range of 1.5 millimeters to 4.0 millimeters.

In some embodiments, the housing 102 may include additional elements such as an illumination system configured to illuminate a target object for imaging. The illumination system may include a light emitting diode, laser diode, black body radiation source, or another illumination source. Additionally, the illumination system may include optics for dispersing or focusing optical radiation for illumination of the target object. The illumination system may be housed inside of the housing 102, may attach to the external surfaces of the housing 102, or may be a separate device or component configured to illuminate the target object for capturing an image by the imaging engine device 100. Further, the housing 102 may include an aiming system communicatively coupled to the illumination system. The aiming system may direct the illumination system to illuminate a target object for imaging. Depending on the implementation, the aiming system may automatically detect the presence of an object of interest, designate the object of interest as a target object, and focus the illumination system to illuminate the target object. Similarly to the illumination system, the aiming system may be housed inside of the housing 102, may attach to the external surfaces of the housing 102, or may be a separate device or component configured to direct the illumination system.

Depending on the implementation, the imaging engine device 100 may be implemented in a barcode reader as described in FIGS. 4 and 5 below. In such implementations, the housing 102 may be a housing of a barcode reader. Similarly, the docking station 101 may be a docking station for a barcode reader or may be a docking station in the barcode reader itself. As such, though the exemplary embodiment illustrated in FIG. 1 shows one potential design, it will be understood that further designs and devices in which the imaging engine device 100 may be implemented are also disclosed herein.

As described above, prior techniques use lens holders for stability and/or durability of components of a lens assembly 120. However, lens holders are bulky and reduce the effective size of apertures. As such, as illustrated in the exemplary embodiment of FIG. 2, a first lens element of the adjustable lens group couples to a carriage of the actuator by way of threads. Similarly, a second lens element of the adjustable lens group is fixedly co-located to the first lens element. As such, to address these problems, the lens assembly may be built as specified in FIGS. 2 and 3 below.

Figure 2:
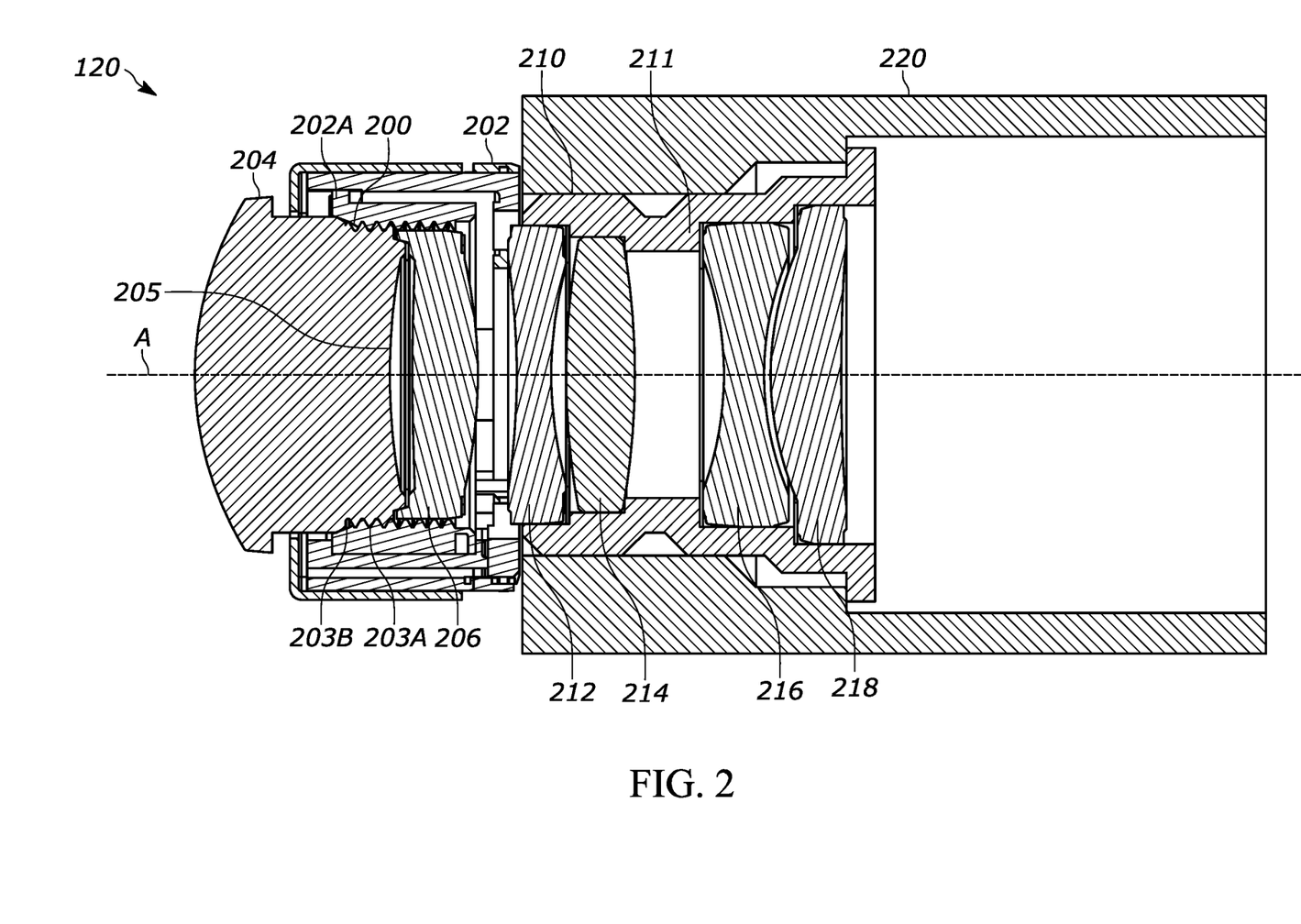
FIG. 2 illustrates a schematic side view of a lens assembly including an actuator, an adjustable lens group comprised of a threaded lens element and a fixedly co-located lens element, and a fixed lens group in accordance with some embodiments.

Referring next to FIG. 2, the lens assembly 120 includes a number of optical elements disposed along a central optical axis A. In particular, the lens assembly 120 includes an adjustable lens group 200 and a rear lens group 210. In some implementations, the adjustable lens group 200 includes at least a first lens element 204 and a second lens element 206. The first lens element 204 includes threads 203A, and is therefore at least partially threaded. In some implementations, the threads 203A surround the entire circumference of a portion of the first lens element 204 (also referred to as the "threaded lens element 204"). In further implementations, the threads 203A surround the entire circumference of the entirety of the threaded lens element 204. In still further implementations, the threads 203A surround a portion of the circumference for a portion or the entirety of the threaded lens element 204. In some such implementations, the threads 203A function akin to a lock rather than the threads of a screw. Put another way, the threads 203A may be relatively short and only require a short turn (e.g., less than 360 degrees) to lock into place rather than requiring multiple full turns to fully screw into place. Depending on the implementation, the threads 203A may be tapered, non-tapered, straight, and/or have a uniform pitch for each thread to aid in assembly and/or in stability.

In some implementations, the second lens element 206 is fixedly co-located to the first lens element 204. As such, the second lens element 206 is coupled to the first lens element 204 such that moving the first lens element 204 similarly moves the second lens element 206. Similarly, in some such implementations, the second lens element 206 is coupled to the first lens element 204 such that the threads 203A that hold the first lens element 204 in place similarly hold the second lens element 206 by holding the first lens element 204 in place. In some implementations, the second lens element 206 is disposed and co-located to the first lens element 204 such that the deviation between the central optical axis A and the mechanical axes of the first lens element 204 and the second lens element 206 are substantially aligned. As such, the net decentration of the lens assembly 120 is reduced. In some implementations, the axes are substantially aligned when the axes have no deviation between then. In further implementations, the axes are substantially aligned when the axes have a deviation of up to 5%, 10%, 15%, 20%, or any similarly suitable deviation.

Depending on the implementation, adjustable lens group 200 may further include an aperture 205 between the first lens element 204 and the second lens element 206. In some implementations, the aperture 205 is formed by the geometry of the first lens element 204 and the second lens element 206. In further implementations, the aperture 205 is formed by additional material disposed between the first lens element 204 and the second lens element 206 to shape and/or refine the shape of aperture 205.

Further, the lens assembly 120 is partially or entirely encapsulated by an actuator 202 in an actuator carriage 202A. In some implementations, the actuator carriage 202A carries the adjustable lens group 200. In such implementations, the actuator 202 adjusts the adjustable lens group relative to the rear lens group 210. In some implementations, the actuator 202 is actively aligned to the rear lens group 210 as described below with regard to FIG. 3, and both the actuator 202 and the rear lens group 210 are fixed to a chassis 220. In some such implementations, the actuator 202 and the rear lens group 210 are fixed to the chassis 220 such that the actuator and the rear housing 211 are fixed adjacent to each other. In further implementations, the rear housing 211 is fixed to the chassis 220 such that the rear housing 211 is at least partially disposed within the chassis 220. In some such implementations, the actuator 202 including the adjustable lens group 200 is fixed to the outside of the chassis 220 for easier active alignment. In other such implementations, the actuator 202 is disposed at least partially in the chassis 220, and the chassis 220 may be part of a larger housing of an imaging engine such as housing 102.

In some implementations, the actuator carriage 202A has at least one threaded inner wall 203B, configured to receive the threads 203A of the threaded lens element 204. Depending on the implementation, the actuator carriage inner walls 203B may be circular and/or cylindrical, and one threaded wall 203B may comprise the entire circumference of the actuator carriage 202A. In further implementations, the actuator carriage 202A may be rectangular or any other suitable shape, and each inner wall may be a threaded inner wall 203B.

In some implementations, the actuator 202 is an actuator capable of moving the adjustable lens group 200 forward and/or backwards, such as a voice coil motor (VCM) actuator or a linear ball-bearing actuator. In such implementations, the actuator 202 moves the adjustable lens group 200 relative to the rear lens group 210. In some implementations, the actuator 202 moves the adjustable lens group 200 up to at least 50, 100, 150, 200, 400, 800, or 1000 micrometers. In other implementations, the actuator 202 moves the adjustable lens group 200 up to any other similarly suitable distance. The actuator 202 holds and moves the carriage 202A for the adjustable lens group 200 such that the carriage 202A holding adjustable lens group is free-floating relative to the remainder of the lens assembly 120. In some such implementations, the actuator 202 holds the carriage 202A and the adjustable lens group 200 free floating such that no optical element (e.g., lens 204 or lens 206) in the adjustable lens group 200 physically comes into contact with any optical element of the rear lens group 210. Depending on the implementation, the actuator 202 may hold the carriage 202A and the adjustable lens group 200 free-floating by way of a coil, magnet, ball-bearings, or other such technique known in the art.

In implementations in which a carriage 202A of the actuator 202 is free-floating and/or holds the adjustable lens group 200 free-floating, the at least one threaded wall 203B is at least one wall of the carriage 202A in the actuator 202, and the threads 203A hold the threaded lens 204 in place by way of the threaded wall 203B. As such, the threaded lens 204 does not eject from the carriage 202A of the actuator 202 unless the user intends to and actively takes steps to remove the threaded lens 204. Further, the threaded wall 203B and the threads 203A hold the threaded lens 204 in place such that the threaded lens 204 remains set in the actuator 202 and/or carriage 202A of the actuator 202 even through a physical (e.g., mechanical) shock. For example, the threaded lens 204 may remain set in the actuator 202 through drops from various heights, such as from 2 feet, 4 feet, 8 feet, 16 feet, or any other suitable height. Similarly, the threaded lens 204 may remain set in the actuator 202 through shocks and/or acceleration of up to 3000 g, 4500 g, or 6000 g. To provide greater support and/or better set the threaded lens 204, in some implementations, an adhesive or epoxy may be applied to the threads 203A and the threaded wall 203B.

In further implementations in which a carriage 202A of the actuator 202 is free-floating and/or holds the adjustable lens group 200 free-floating, the threaded wall 203B and the threads 203A of the threaded lens also hold the second lens 206 of the adjustable lens group 200 in place. In such implementations, the co-location of the second lens 206 onto the threaded lens 204 holds the second lens 206 set in the actuator as well. In some such implementations, the second lens 206 is held co-located to the threaded lens 204 by way of an adhesive such as an ultraviolet (UV) curing glue. In further implementations, an optical insert (not shown) is attached to the threaded lens 204 via an adhesive such as a UV curing glue. In such implementations, the second lens 206 is further attached to the optical insert via an adhesive such as a UV curing glue such that the second lens 206 is fixedly co-located to the threaded lens 204. As such, the second lens 206 moves in concert with the threaded lens 204 and remains free-floating and set within the carriage 202A of the actuator 202. Although FIG. 2 illustrates two lenses 204 and 206 in the adjustable lens group 200, the use of two lenses is a single implementation. As such, the adjustable lens group may have three, four, or any similarly suitable number of lenses or other optical elements as part of the adjustable lens group 200, each co-located to the lenses 204 and/or 206. Each optical element co-located to the threaded lens 204 is positioned and co-located so as to displace the optical elements concentrically and to reduce decentration of the adjustable lens group 200. As the centration of the lens group is the deviation between the optical and mechanical axes, aligning the lenses and/or optical elements concentrically by co-locating each element to the threaded lens 204 improves the centration of the adjustable lens group without potentially warping or misaligning lens axes by threading in multiple lenses into a carriage 202A of the actuator 202. Further, co-locating optical elements such as the second lens 206 to the threaded lens 204 allows control over at least five degrees of freedom for the lenses: centration, surface distance between optical surfaces, and tilt along the x, y, and z axes.

In some implementations, the threaded lens 204 is made of a plastic, such as a Crown or Flint type plastic. In some implementations, the plastic has an index of refraction of approximately 1.65 and an Abbe value of approximately 22. In further implementations, the plastic has an index of refraction of approximately 1.53 and an Abbe value of approximately 56. Depending on the implementation, manufacturing a plastic threaded lens may be easier, cheaper, and/or generally more feasible than manufacturing a glass threaded lens. However, in some such implementations, each of the second lens 206 and/or any further optical elements may be made of a similar plastic material or a glass material, such as a Crown or Flint type glass. For example, the second lens 206 may be a plastic lens as described above. In further implementations, the second lens 206 may be a Crown glass lens with an index of refraction in the range of approximately 1.51-1.62 and/or an Abbe value of approximately 59 or a Flint glass lens with an index of refraction in the range of approximately 1.57-1.75 and/or an Abbe value of approximately 24. As the other optical elements may be co-located to the threaded lens 204, the other optical elements may not have threads, thus eliminating the noted problems with using glass for the optical elements.

The lens assembly 120 further includes a rear lens group 210. In the exemplary embodiment of FIG. 2, the rear lens group 210 comprises fixed optical elements disposed within a rear housing 211, including each of fixed optical elements 212, 214, 216, and 218. Depending on the implementation, each fixed optical element 212, 214, 216, and 218 may be a lens made of any of a Crown plastic, a Crown glass, a Flint plastic, a Flint glass, or a similarly suitable material as described above. In some implementations, each optical element will be the same type of lens, while in other implementations, each optical element is a different type of lens or some combination thereof. Each fixed optical element 212, 214, 216, and 218 is disposed along the central optical axis A. Further, the actuator 202 actively and/or automatically aligns the adjustable lens group 200 to the rear lens group 210. By automatically aligning the adjustable lens group 200 to the rear lens group 210, the actuator 202 compensates for errors with positioning of optical elements in the lens assembly 120. For example, active alignment may address errors caused by flaws in the threaded lens 204 introduced by improper thread tooling, decentration errors in the rear lens group and/or adjustable lens group, optical aberrations in images taken in a field of view of the lens assembly 120, and/or other similar errors.

Figure 3:
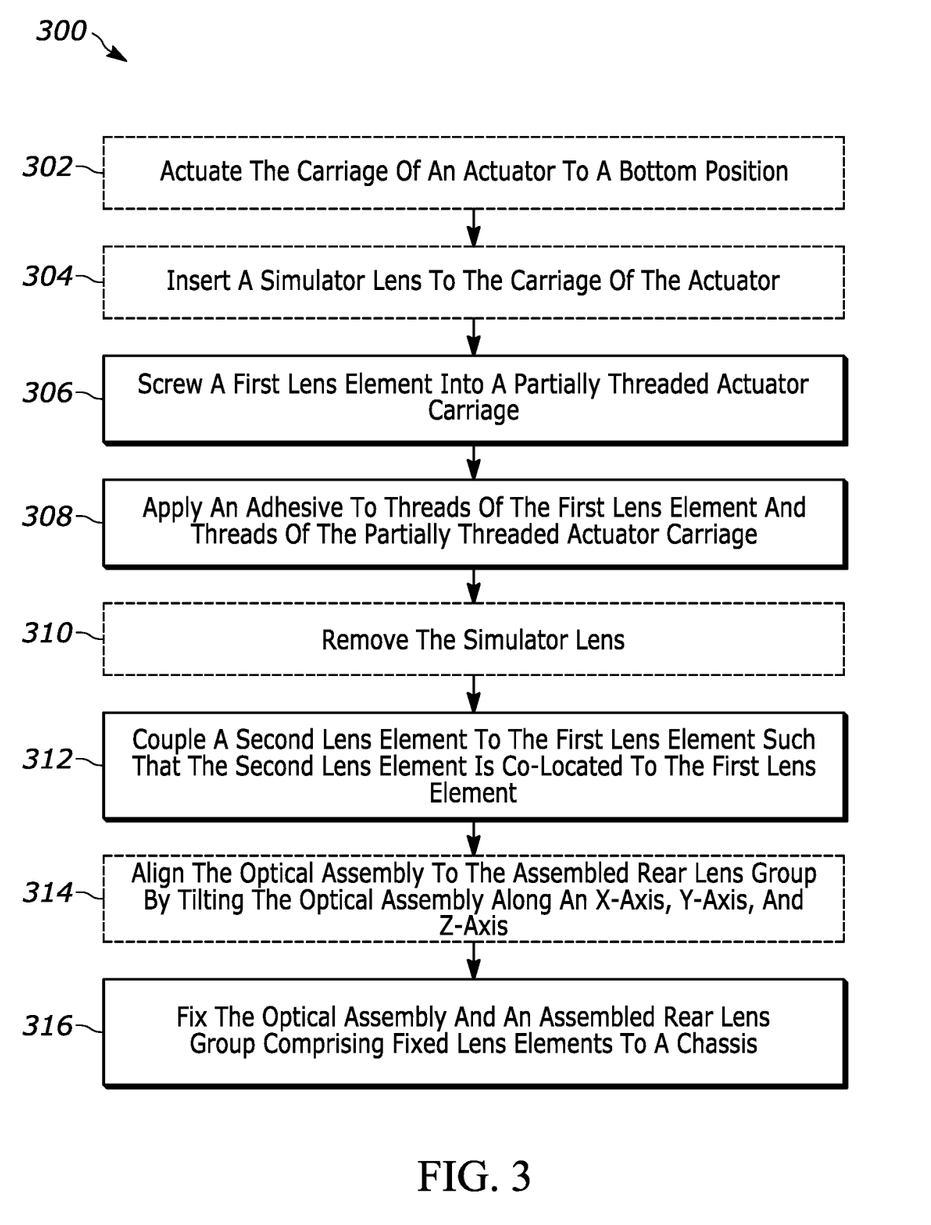
FIG. 3 illustrates a flow diagram of an example method for assembling and configuring an adjustable lens group of the lens assembly of FIG. 1 in accordance with some embodiments.

Referring next to FIG. 3, a flowchart illustrates a method 300 for assembling an example lens assembly. For the sake of clarity, FIG. 3 is discussed with regard to the lens assembly 120, adjustable lens group 200, actuator 202, threaded lens 204, second lens 206, rear lens group 210, and fixed lenses 212, 214, 216, and 218. However, any similarly suitable elements may be used to implement the techniques of method 300.

At block 302, the actuator 202 may actuate the carriage 202A of the actuator 202 to a bottom or default position. In some implementations, the actuator carriage 202A begins at the bottom position, and the flow may skip block 302 and start at block 304 or 306 instead. In further implementations, the actuator 202 is powered through pogo pins that actuate the carriage 202A of the actuator 202 to the bottom position.

At block 304, a user/manufacturer and/or a manufacturing device may insert a simulator lens into the carriage 202A of the actuator. The simulator lens is a fake lens inserted into the actuator to provide a clear position to which the first lens element (i.e. threaded lens) 204 is to be screwed and/or inserted. Depending on the implementation, the simulator lens is inserted and adjusted to a pre-determined position along a z-axis (e.g., along the direction of insertion). In some implementations, the method 300 may not require the use of a simulator lens and, as such, the flow may skip block 304 and continue to and/or start at block 306 instead.

At block 306, the user/manufacturer and/or the manufacturing device inserts a first lens element such as threaded lens 204 into the partially threaded inner walls of the carriage 202A of the actuator 202. In implementations in which a simulator lens is inserted into the carriage 202A of the actuator 202, the threaded lens 204 is inserted into the actuator 202 until blocked from further insertion by the simulator lens. In other implementations, the threaded lens 204 is inserted into the actuator 202 until blocked by an outcrop or architecture of the actuator 202 and/or carriage 202A. In some implementations, the threaded lens 204 is screwed into place such that the threads of the threaded lens 204 and the threads of the partially threaded inner walls 203B of the carriage 202A of the actuator 202 interlock and hold the threaded lens 204 in place.

At block 308, an adhesive or an epoxy is applied to the threads of the threaded lens element 204 and/or the partially threaded inner walls 203B of the carriage 202A of the actuator 202 to support and/or hold the threaded lens element 204 in place. In implementations in which a simulator lens is used, flow may continue to block 310, and the simulator lens may be removed. In some implementations, the simulator lens may be removed after the adhesive settles and/or solidifies. In other implementations, the simulator lens may be removed before applying the adhesive or while the adhesive is settling. In implementations in which there is no simulator lens, the flow may skip from block 308 to block 312.

At block 312, the user/manufacturer and/or the manufacturing device couples a second lens element 206 to the threaded lens element 204. The second lens element 206 is coupled to the threaded lens element 204 by co-locating the second lens element 206 to the threaded lens element 204 such that the second lens element 206 is disposed along the central optical axis along which the threaded lens element 204 is disposed. Further, the second lens element 206 is fixedly co-located such that the geometrical axis of the second lens element 206 is substantially aligned with the central optical axis. In some implementations, the second lens element 206 is coupled to the threaded lens 204 using an adhesive, such as a UV curing glue. In further implementations, the adhesive may be the same adhesive used to secure the threads of the threaded lens 204 in block 308. In other implementations, the adhesive may be a different adhesive suited for coupling lenses and/or optical elements together.

At block 316, the user/manufacturer and/or the manufacturing device may align the adjustable lens group 200 and/or cause the optical assembly 120 to align the adjustable lens group 200 with the assembled rear lens group 210 by tilting the adjustable lens group 200 along the x-axis, y-axis, and z-axis. Depending on the implementation, a five axis gripper may hold, move, and tilt the adjustable lens group 200. In some implementations, a computing device receives information from the imaging sensor 112 while the alignment occurs and causes the five axis gripper to tilt the adjustable lens group 200 until the adjustable lens group 200 is positioned at an optimal focus position. In some implementations, the optimal focus position is determined by analyzing modulus of the transfer function curves and analyzing the resolution of slated edges at a distant target.

At block 316, the user/manufacturer and/or the manufacturing device fixes the adjustable lens group 200 and an assembled rear lens group 210 comprising fixed lens elements such that the carriage 202A of the actuator 202 can move the threaded lens 204 and the second lens element 206 relative to the assembled rear lens group 210. In some implementations, the actuator 202 and the assembled rear lens group 210 are fixed adjacent to each other. In further implementations, the assembled rear lens group 210 is fixed at least partially within the chassis 220 and the actuator 202 is fixed to the outside of the chassis 220. In some implementations, the rear lens group 210 is assembled using similar techniques as outlined above with regard to the adjustable lens group. In further implementations, the rear lens group 210 is assembled using other techniques known in the art. Depending on the implementation, the assembled rear lens group 210 is fixed at block 316 while a manufacturer performs an active alignment technique with the adjustable lens group 200 before fixing the actuator 202 to the chassis.

Figure 4:
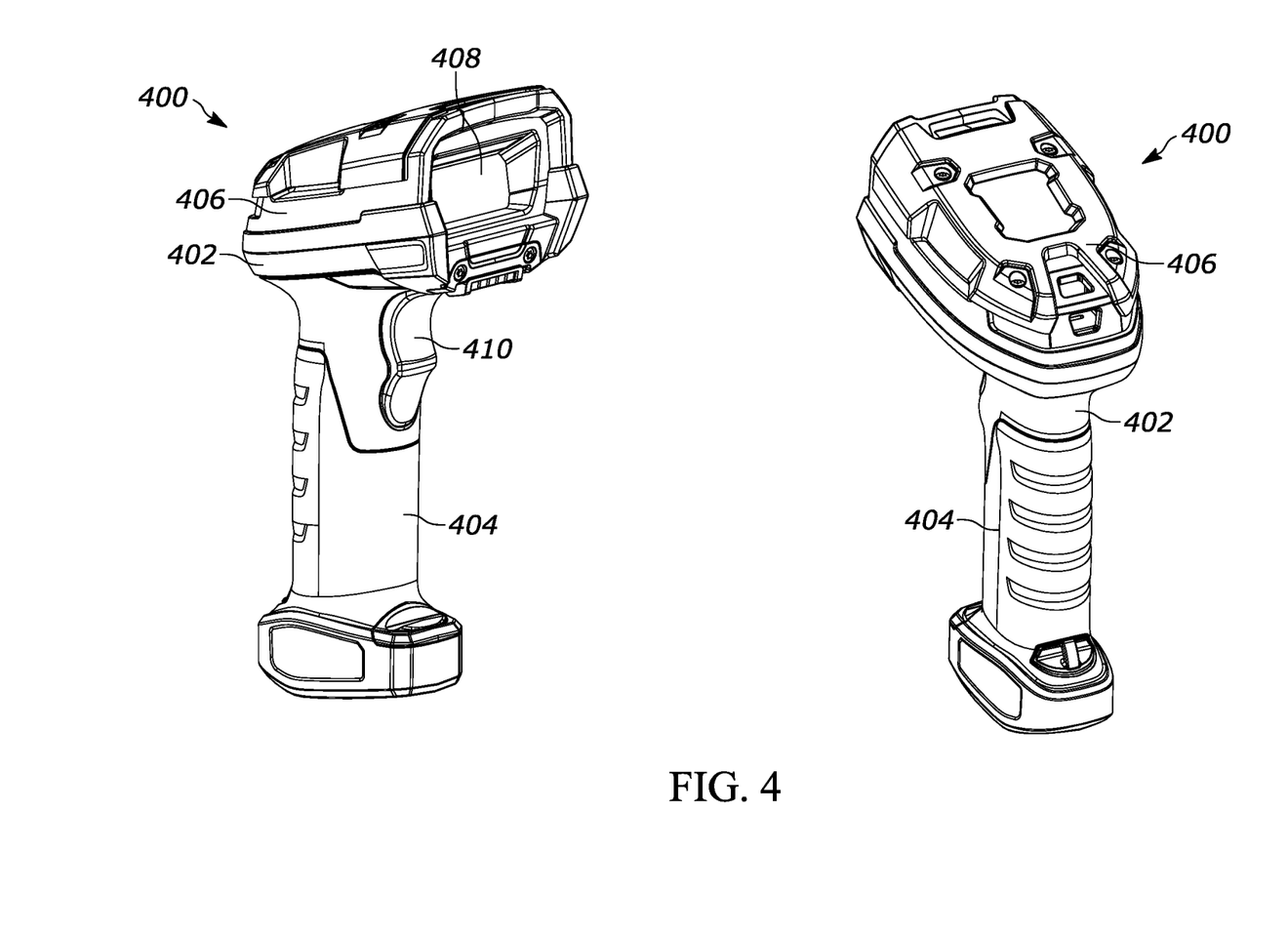
FIG. 4 illustrates a perspective front and back view of an optical imaging reader in accordance with some embodiments.
Figure 5:
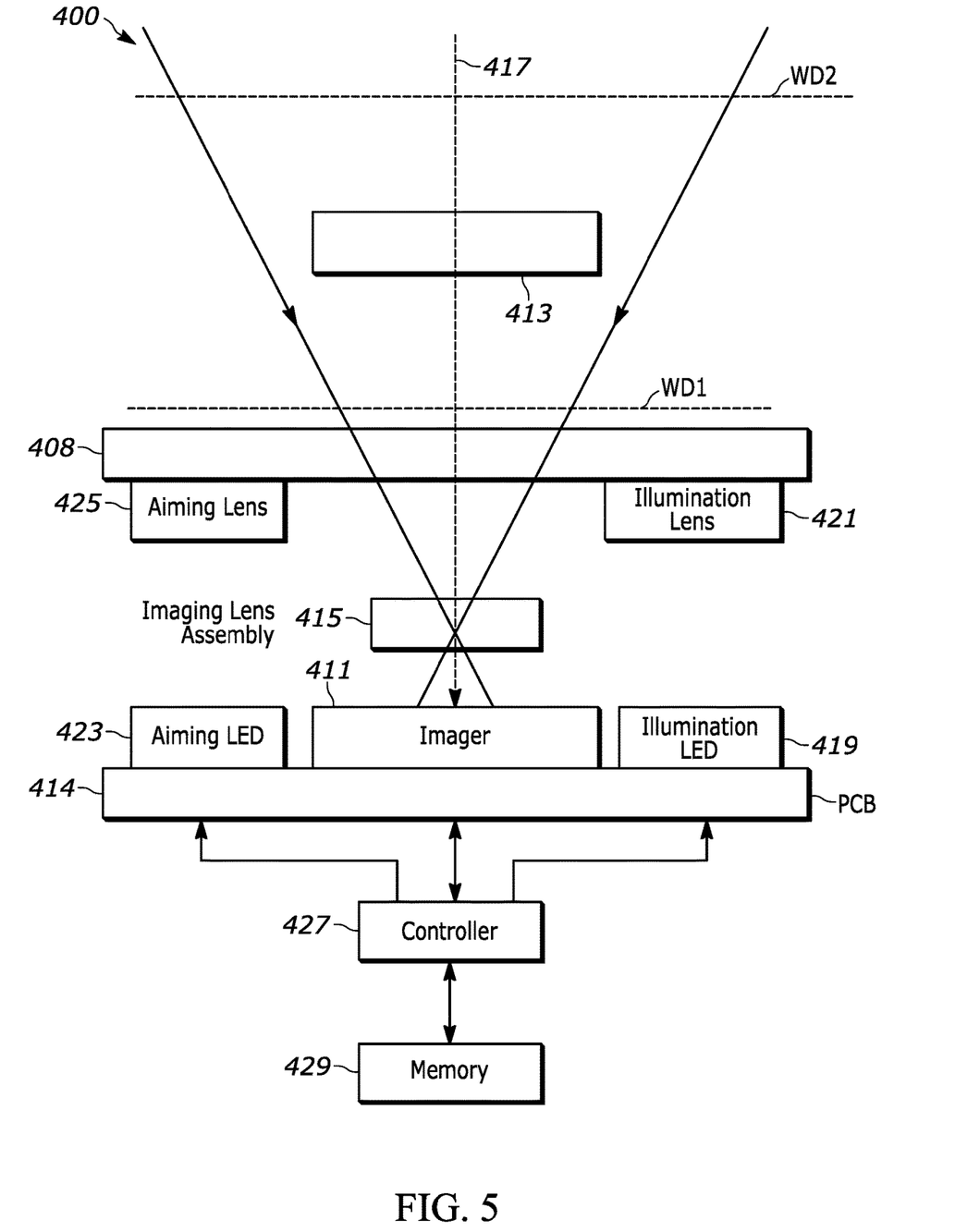
FIG. 5 illustrates a schematic block diagram of various components of the reader of FIG. 4 in accordance with some embodiments.

The above-identified imaging engine device 100 can be implemented in the barcode reader of FIGS. 4 and 5. FIGS. 4 and 5 are exemplary embodiments of an optical imaging reader 400 (also referred to as a barcode reader) and the components thereof. However, it will be understood that the above-identified imaging engine is not exclusively implemented in barcode readers 400, and is instead able to be implemented in any such device employing an image assembly with a field-of-view (FOV). With more specific reference to barcode readers, it will be further understood that, although a particular embodiment of a barcode reader 400 is disclosed, this disclosure is applicable to a variety of barcode readers, including, but not limited to, gun-type handheld readers, mobile computer-type readers, presentation readers, etc. Further, it will be understood that the barcode readers 400 may implement similar techniques using a lens assembly 120 as described with regard to FIG. 2 above without using a separate imaging engine device 100 as described with regard to FIG. 1 above. In some such implementations, the barcode reader 400 may be or include a barcode scanning platform that incorporates requisite components of the imaging engine 100 using an architecture more suited for the barcode reader 400.

Referring now to the drawings, FIG. 4 illustrates an exemplary barcode reader 400 having a housing 402 with a handle portion 404, also referred to as a handle 404, and a head portion 406, also referred to as a scanning head 406. The head portion 406 includes a window 408, and is configured to be positioned on the top of the handle portion 404. In some implementations, the window 408 may be the front aperture 114 of the imaging engine device 100. The handle portion 404 is configured to be gripped by a reader user (not shown) and includes a trigger 410 for activation by the user. Optionally included in an embodiment is a base (not shown), also referred to as a base portion, that may be attached to the handle portion 404 opposite the head portion 406, and is configured to stand on a surface and support the housing 402 in a generally upright position. The barcode reader 400 can be used in a hands-free mode as a stationary workstation when it is placed on a countertop or other workstation surface. The barcode reader 400 can also be used in a handheld mode when it is picked up off the countertop or base station, and held in an operator's hand. In the hands-free mode, products can be slid, swiped past, or presented to the window 408 for the reader to initiate barcode reading operations. In the handheld mode, the barcode reader 400 can be moved towards a barcode on a product, and the trigger 410 can be manually depressed to initiate imaging of the barcode.

Other implementations may provide only handheld or only hands-free configurations. In the embodiment of FIG. 4, the reader 400 is ergonomically configured for a user's hand as a gun-shaped housing 402, though other configurations may be utilized as understood by those of ordinary skill in the art. As shown, the lower handle 404 extends below and rearwardly away from the body 402 along a centroidal axis obliquely angled relative to a central FOV axis of a FOV of an imaging assembly within the scanning head 402.

For at least some of the reader embodiments, an imaging assembly includes a light-detecting sensor or imager 411 operatively coupled to, or mounted on, a printed circuit board (PCB) 414 in the reader 400 as shown in FIG. 5. Depending on the implementation, the imaging assembly may be or may include imaging system 110. Similarly the PCB 414 may be the PCB 106 of the imaging engine device 100. In an embodiment, the imager 411 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 415 over a field of view along an imaging axis 417 through the window 408. In some implementations, the imaging lens assembly 415 includes or is the lens assembly 120. Similarly, in some implementations, the imager 411 is the imager 112. The return light is scattered and/or reflected from a target 413 over the field of view. The imaging lens assembly 415 is operative for focusing the return light onto the array of image sensors to enable the target 413 to be read. In particular, the light that impinges on the pixels is sensed and the output of those pixels produce image data that is associated with the environment that appears within the FOV (which can include the target 413). This image data is typically processed by a controller (usually by being sent to a decoder) which identifies and decodes decodable indicia captured in the image data. Once the decode is performed successfully, the reader can signal a successful "read" of the target 413 (e.g., a barcode). The target 413 may be located anywhere in a working range of distances between a close-in working distance (WD1) and a far-out working distance (WD2). In an embodiment, WD1 is about one-half inch from the window 408, and WD2 is about thirty inches from the window 408.

An illuminating light assembly may also be mounted in the imaging reader 400. The illuminating light assembly includes an illumination light source, such as at least one light emitting diode (LED) 419 and at least one illumination lens 421, and preferably a plurality of illumination LEDs and illumination lenses, configured to generate a substantially uniform distributed illumination pattern of illumination light on and along the target 413 to be read by image capture. At least part of the scattered and/or reflected return light is derived from the illumination pattern of light on and along the target 413.

An aiming light assembly may also be mounted in the imaging reader 400 and preferably includes an aiming light source 423, e.g., one or more aiming LEDs or laser light sources, and an aiming lens 425 for generating and directing a visible aiming light beam away from the reader 400 onto the target 413 in the direction of the FOV of the imager 411.

Further, the imager 411, the illumination source 419, and the aiming source 423 are operatively connected to a controller or programmed microprocessor 427 operative for controlling the operation of these components. A memory 429 is connected and accessible to the controller 427. Preferably, the microprocessor 427 is the same as the one used for processing the captured return light from the illuminated target 413 to obtain data related to the target 413. Though not shown, additional optical elements, such as collimators, lenses, apertures, compartment walls, etc. are provided in the head portion 406 of the housing. Although FIG. 5 shows the imager 411, the illumination source 419, and the aiming source 423 as being mounted on the same PCB 414, it should be understood that different embodiments of the barcode reader 400 may have these components each on a separate PCB, or in different combinations on separate PCBs. For example, in an embodiment of the barcode reader 400, the illumination LED source is provided as an off-axis illumination (i.e., has a central illumination axis that is not parallel to the central FOV axis).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An optical assembly for use in an imaging engine to maintain stability through physical shock and to control decentration, the optical assembly comprising:
   an actuator including an inner carriage, wherein one or more inner walls of the inner carriage are at least partially threaded;
   an adjustable lens group disposed along a central optical axis to receive light, the adjustable lens group including:
      a first lens element disposed along the central optical axis, wherein the first lens element is threaded and held in place by the at least partially threaded one or more inner walls of the inner carriage, and
      a second lens element, wherein the second lens element is coupled to the first lens element, and further wherein the second lens element is fixedly co-located to the first lens element such that the second lens element is disposed along the central optical axis, a geometrical axis of the second lens element is substantially aligned with the central optical axis, and the at least partially threaded one or more inner walls of the inner carriage holds the second lens element by the fixed co-location to the first lens element; and
   a rear lens group disposed in a rear housing and along the central optical axis to receive light from the adjustable lens group, wherein:
      the adjustable lens group is actively aligned relative to the rear lens group,
      the rear lens group includes fixed optical elements, and
      the actuator and the rear housing are fixed to a chassis.

2. The optical assembly of claim 1, wherein the physical shock has an acceleration of up to at least 4500 g.

3. The optical assembly of claim 1, wherein the actuator is a voice coil motor actuator.

4. The optical assembly of claim 1, wherein the inner carriage of the actuator is free-floating relative to a remainder of the actuator.

5. The optical assembly of claim 1, wherein threads of the first lens element are attached to threads of the at least partially threaded one or more inner walls of the inner carriage by way of an adhesive.

6. The optical assembly of claim 1, wherein the actuator is configured to change a focus of the optical assembly by adjusting a position of the adjustable lens group relative to the rear lens group.

7. The optical assembly of claim 1, wherein the actuator is disposed such that neither of the actuator nor the adjustable lens group physically touch the fixed optical elements.

8. The optical assembly of claim 1, wherein the first lens element is a plastic lens.

9. The optical assembly of claim 1, wherein the second lens element is a plastic lens.

10. The optical assembly of claim 1, wherein the adjustable lens group further comprises:
an optical element, wherein the optical element is coupled to the second lens element, and further wherein the optical element is fixedly co-located to the second lens element such that the optical element is disposed along the central optical axis and a geometrical axis of the optical element is substantially aligned with the central optical axis.

11. An imaging engine that maintains stability of lenses through physical shock, the imaging engine comprising:
an optical assembly, the optical assembly including:
an actuator including an inner carriage, wherein one or more inner walls of the inner carriage are at least partially threaded;
an adjustable lens group disposed along a central optical axis to receive light, the adjustable lens group including:
a first lens element disposed along the central optical axis, wherein the first lens element is threaded and held in place by the at least partially threaded one or more inner walls of the inner carriage, and
a second lens element, wherein the second lens element is coupled to the first lens element and further wherein the second lens element is fixedly co-located to the first lens element such that the second lens element is disposed along the central optical axis, a geometrical axis of the second lens element is substantially aligned with the central optical axis, and the at least partially threaded one or more inner walls of the inner carriage holds the second lens element by the fixed co-location to the first lens element;
a rear lens group disposed in a rear housing and along the central optical axis to receive light from the adjustable lens group, wherein:
the adjustable lens group is actively aligned relative to the rear lens group,
the rear lens group includes fixed optical elements, and
the actuator and the rear housing are fixed to a chassis;
an imaging sensor disposed along the central optical axis such that the imaging sensor receives light from the optical assembly; and
a microprocessor and computer-readable media storing machine readable instructions that, when executed, cause the actuator to change a focus of the optical assembly by adjusting a position of the adjustable lens group.

12. The imaging engine of claim 11, wherein the physical shock has an acceleration of up to at least 4500 g.

13. The imaging engine of claim 11, wherein the actuator is a voice coil motor actuator.

14. The imaging engine of claim 11, wherein the inner carriage of the actuator is free-floating relative to a remainder of the actuator.

15. The imaging engine of claim 11, wherein threads of the first lens element are attached to threads of the at least partially threaded one or more inner walls of the inner carriage by way of an adhesive.

16. The imaging engine of claim 11, wherein the actuator changes the focus of the optical assembly by adjusting a position of the adjustable lens group relative to the rear lens group.

17. The imaging engine of claim 11, wherein the actuator is disposed such that neither of the actuator nor the adjustable lens group physically touch the one or more fixed optical elements.

18. The imaging engine of claim 11, wherein the first lens element is a plastic lens.

19. The imaging engine of claim 11, wherein the second lens element is a plastic lens.

20. The imaging engine of claim 11, wherein the adjustable lens group further comprises:
an optical element, wherein the optical element is coupled to the second lens element, and further wherein the optical element is fixedly co-located to the second lens element such that the optical element is disposed along the central optical axis and a geometrical axis of the optical element is substantially aligned with the central optical axis.

21. A barcode scanning platform having a field of view (FOV) and for scanning a barcode in the FOV, the barcode scanning platform comprising:
an optical assembly, the optical assembly including:
an actuator including an inner carriage, wherein one or more inner walls of the inner carriage are at least partially threaded;
an adjustable lens group disposed along a central optical axis to receive light from the barcode in the FOV, the adjustable lens group including:
a first lens element disposed along the central optical axis, wherein the first lens element is threaded and held in place by the at least partially threaded one or more inner walls of the inner carriage, and
a second lens element, wherein the second lens element is coupled to the first lens element and further wherein the second lens element is fixedly co-located to the first lens element such that the second lens element is disposed along the central optical axis, a geometrical axis of the second lens element is substantially aligned with the central optical axis, and the at least partially threaded one or more inner walls of the inner carriage holds the second lens element by the fixed co-location to the first lens element;
a rear lens group disposed in a rear housing and along the central optical axis to receive light from the adjustable lens group, wherein:
the adjustable lens group is actively aligned relative to the rear lens group,
the rear lens group includes fixed optical elements, and
the actuator and the rear housing are fixed to a chassis;
an imaging sensor disposed along the central optical axis such that the imaging sensor receives light from the optical assembly; and a microprocessor and computer-readable media storing machine readable instructions that, when executed, cause the actuator to focus the adjustable lens group.

22. The barcode scanning platform of claim 21, wherein the physical shock has an acceleration of up to at least 4500 g.

23. The barcode scanning platform of claim 21, wherein the actuator is a voice coil motor actuator.

24. The barcode scanning platform of claim 21, wherein the inner carriage of the actuator is free-floating relative to a remainder of the actuator.

25. The barcode scanning platform of claim 21, wherein threads of the first lens element are attached to threads of the at least partially threaded inner walls by way of an adhesive.

26. The barcode scanning platform of claim 21, wherein the actuator changes a focus of the optical assembly by adjusting a position of the adjustable lens group relative to the rear lens group.

27. The barcode scanning platform of claim 21, wherein the actuator is disposed such that neither of the actuator nor the adjustable lens group physically touch the one or more fixed optical elements.

28. The barcode scanning platform of claim 21, wherein the first lens element is a plastic lens.

29. The barcode scanning platform of claim 21, wherein the second lens element is a plastic lens.

30. The barcode scanning platform of claim 21, wherein the adjustable lens group further comprises:
an optical element, wherein the optical element is coupled to the second lens element, and further wherein the optical element is fixedly co-located to the second lens element such that the optical element is disposed along the central optical axis and a geometrical axis of the optical element is substantially aligned with the central optical axis.

31. A method of assembling an optical assembly for use in an imaging engine having a field of view (FOV), wherein the optical assembly maintains stability through physical shock and controls decentration, the method comprising:
screwing a first lens element into an at least partially threaded actuator carriage, wherein the first lens element is threaded and wherein the first lens element is disposed along a central optical axis;
applying an adhesive to threads of the first lens element and threads of the at least partially threaded actuator carriage;
coupling a second lens element to the first lens element, wherein the second lens element is fixedly co-located to the first lens element such that the second lens element is disposed along the central optical axis and a geometrical axis of the second lens element is substantially aligned with the central optical axis; and
fixing the optical assembly and an assembled rear lens group comprising fixed lens elements to a chassis such that the threaded actuator carriage can move the first lens element and the second lens element relative to the assembled rear lens group.

32. The method of claim 31, further comprising actuating the carriage of the actuator to a bottom position before screwing the first lens element.

33. The method of claim 31, further comprising inserting a simulator lens to the carriage of the actuator before screwing the first lens element, wherein the first lens element is screwed in relative to the simulator lens.

34. The method of claim 33, further comprising, responsive to screwing the first lens element and before coupling the second lens element to the first lens element, removing the simulator lens.

35. The method of claim 31, wherein the first lens element is screwed along a first direction into the actuator carriage until the actuator carriage blocks the first lens element from further movement along the first direction.

36. The method of claim 31, further comprising aligning the optical assembly to the assembled rear lens group by a five axis gripper that moves the optical assembly by tilting the optical assembly along an x-axis, a y-axis, and a z-axis.

* * * * *